(12) United States Patent
Talati

(10) Patent No.: US 9,088,568 B1
(45) Date of Patent: Jul. 21, 2015

(54) APPARATUS, SYSTEM AND METHOD FOR SECURE DATA EXCHANGE

(71) Applicant: Talati Family LP, Sunnyvale, TX (US)

(72) Inventor: Kirit K. Talati, Sunnyvale, TX (US)

(73) Assignee: TALATI FAMILY LP, Sunnyvale, TX (US)

( * ) Notice: Subject to any disclaimer, the term of this patent is extended or adjusted under 35 U.S.C. 154(b) by 0 days.

(21) Appl. No.: 14/484,020

(22) Filed: Sep. 11, 2014

Related U.S. Application Data

(60) Provisional application No. 61/876,536, filed on Sep. 11, 2013, provisional application No. 61/926,784, filed on Jan. 13, 2014, provisional application No. 61/992,062, filed on May 12, 2014.

(51) Int. Cl.
*G06F 7/04* (2006.01)
*H04L 29/06* (2006.01)

(52) U.S. Cl.
CPC .......... *H04L 63/0876* (2013.01); *H04L 63/062* (2013.01); *H04L 63/083* (2013.01)

(58) Field of Classification Search
CPC .................... G06F 21/31; G06F 21/10
USPC ....................................... 726/26–30
See application file for complete search history.

(56) References Cited

U.S. PATENT DOCUMENTS

2013/0227653 A1\* 8/2013 Choi ................. 726/4

\* cited by examiner

*Primary Examiner* — Anthony Brown

(57) ABSTRACT

A SDE manager, a method of communicating secure data through a generic electronic delivery system and a SDE client located on a computing device of a user are disclosed. In one embodiment, the SDE manager includes: (1) a SDE portal and (2) a SDE DTA configured to activate access of a user to an SDE system based on an authentication code generated from an e-mail address, a password and a pin provided by the user, generate a unique account number for the user after activation, and thereafter verify the user has the access based on both the unique account number and the authentication code, the SDE DTA further configured to provide a plurality of converters to a SDE client of a verified user in response to a request therefrom.

20 Claims, 8 Drawing Sheets

Fig. 3

Request CMD (400)

| CMD Type | CMD Flag | User ID | Authentication | Secure Data using VDK/SVDK | | Recipient Email List |
|---|---|---|---|---|---|---|
| | | | | Data Type (A or S) | | |
| Create | C | UID | Authentication | ODTID | | OID |
| Access | A | UID | Authentication | ODTID | | RID |
| Query/Time Stamp | T | UID | Authentication | PWD | | PIN |
| Setup/Activate | V | UID | Authentication | | | |

401 — CMD Type (402)
420 — Create
430 — Access
440 — Query/Time Stamp
441 — Setup/Activate
403 — CMD Flag
405 — User ID
407 — Data Type
408 — Recipient Email List
410 — Secure Data using VDK/SVDK Response (450)

| CMD Type | Status | Secure Data using VDK | |
|---|---|---|---|
| Create | Error Code or Success | ODTID 406 | DDK |
| Access | Error Code or Success | Data Type (A or S) 407 | MSC ID |
| Query/Time Stamp | Error code or Success | Time Stamp (RID Access) | MSC ID |
| Setup/Activate | Error Code or Success | OID | DDK |

451 — CMD Type
455 — Create
460 — Access
465 — Query/Time Stamp
466 — Setup/Activate

Fig. 4-a

| ODTID | OID | Doc Ext | Document Name | Document |
|---|---|---|---|---|
| 525 | 527 | 530 | 535 | 537 |

Document Header — Secure Data using MDDK

Secure Data Document (UDN with extension ".sdc" 541)

| SMS ID | NCC | ODTID | OID | Text Message |
|---|---|---|---|---|
| 561 | 562 | 563 | 564 | 565 |

Secure SMS Header — Secure Message using MDDK

Secure SMS Message 560, 550, 570

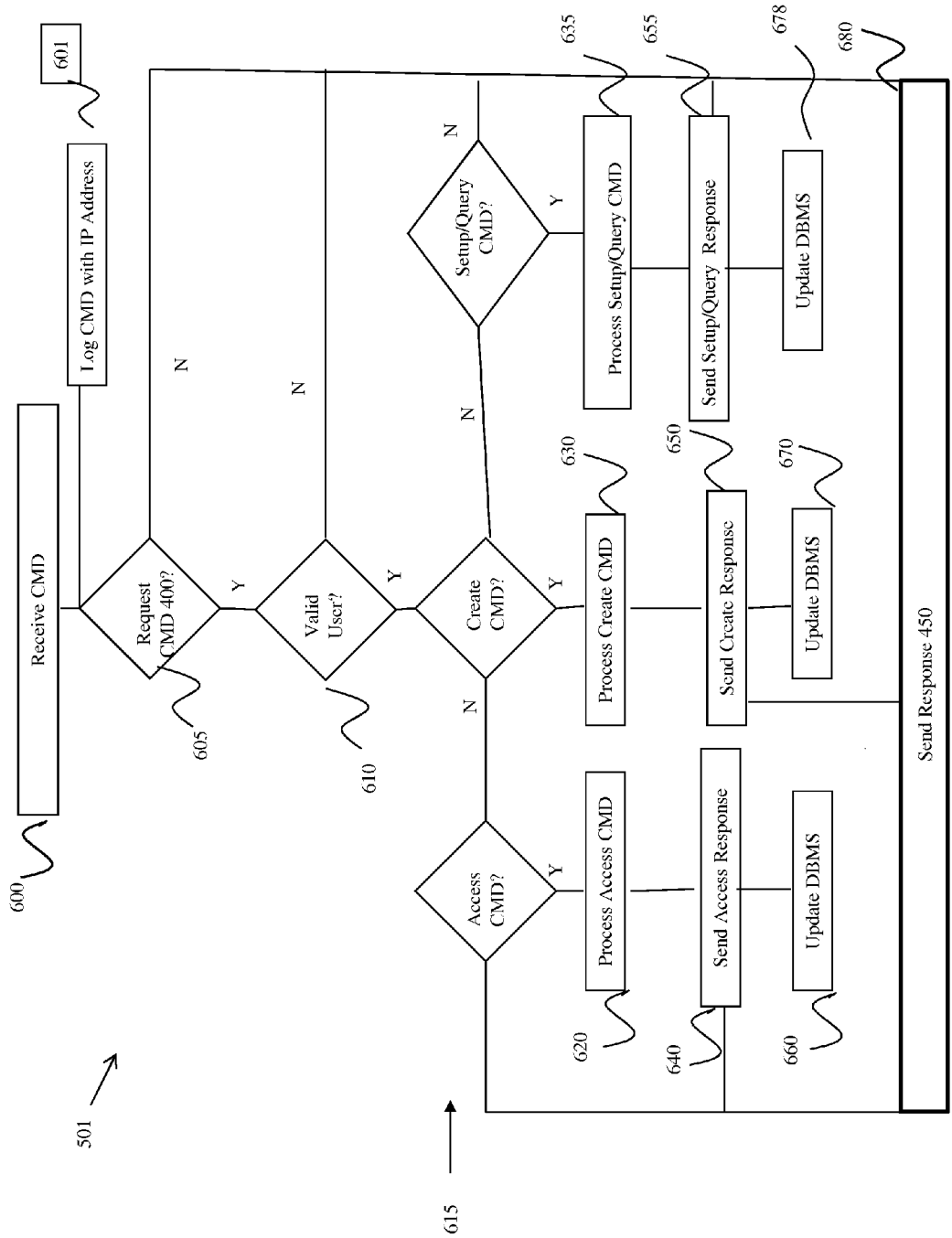

APPARATUS, SYSTEM AND METHOD FOR SECURE DATA EXCHANGE

CROSS-REFERENCE TO RELATED APPLICATIONS

This application claims the benefit of U.S. Provisional Application Ser. No. 61/876,536 filed on Sep. 11, 2013, entitled "APPARATUS AND METHOD FOR NOTARIZED DATA EXCHANGE", U.S. Provisional Application Ser. No. 61/926,784 filed on Jan. 13, 2014, entitled "APPARATUS AND METHOD FOR NOTARIZED DATA EXCHANGE", and U.S. Provisional Application Ser. No. 61/992,062 filed on May 12, 2014, entitled "APPARATUS AND METHOD FOR SECURE DATA EXCHANGE". Each of these provisional applications are commonly assigned with the present disclosure and incorporated herein by reference in their entirety.

TECHNICAL FIELD

This disclosure generally relates to the communication between two or more users or entities using electronic mail delivery services, such as e-mail or SMS text services. More specifically, the disclosure relates to protecting data created, shared or accessed by entities using computers, computing devices or mobile devices over a network, such as the Internet.

BACKGROUND

Secure communication is a major concern for individuals and businesses. Electronic digital signatures are employed to provide secure communication by using cryptography enables a user to authenticate the identity of the originator, the originator's document and digital certificate. Digital certificates, however, are static, vulnerable and subject to fraud and theft. Recent advances using dynamic key cryptography allow improved security wherein the originator can restrict access to a digitally signed document by one or more entities by providing additional data to the system that manages the digitally signed documents. Nevertheless, existing secure systems have to overcome the vulnerability of digital certificates. With many existing systems, the lack of access control and privacy are still a concern since a third party can gain access to a secure message. As such new technology is necessary to provide improved security for communicating electronically.

SUMMARY

A secure data exchange (SDE) manager of a SDE system for the secure delivery of data between users is disclosed. In one embodiment, the SDE manager includes: (1) a SDE portal configured to receive registration information from a user over a network and send an electronic confirmation message to the user over the network in response thereto, wherein the electronic confirmation message provides electronic access to a SDE client for loading on an computing device and (2) a SDE data transaction administrator (DTA) configured to activate access of the user to the SDE system based on an authentication code generated from an e-mail address, a password and a pin provided by the user, generate a unique account number for the user after activation, and thereafter verify the user has the access based on both the unique account number and the authentication code, the SDE DTA further configured to provide a plurality of converters to the SDE client of a verified user in response to a request therefrom.

In another aspect, a method of communicating secure data through a generic electronic delivery system is disclosed. In one embodiment, the method includes: (1) receiving a request from a user at an originator computer to create secure data, (2) determining the user has access to create the secure data based on verifying a password and a pin entered by the user at the originator computer, (3) after verifying the user, receiving original data to send through a generic electronic delivery system, (4) receiving a selection of a recipient to send the original data from the originator computer employing the generic electronic delivery system, (5) receiving a plurality of converters from a remote computer to convert the original data to the secure data having a secure data extension, (6) converting the original data to the secure data employing the plurality of converters and (7) initiating the generic electronic delivery system to send the secure data with the secure data extension to a recipient computer associated with the recipient.

In another aspect, a SDE client located on a computing device of a user is disclosed. In one embodiment, the SDE client includes: (1) a user interface configured to receive input from a user via a computing device and provide information to the user and (2) a secure communication controller configured to generate authentication code associated with the user based on an email address, password and pin provided by the user, employ a plurality of converters to convert original data to secure data and direct a generic electronic mail system to send the secure data, the secure data having a predetermined extension.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 3 illustrates formats of embodiments of a request command and a response command according to the principles of the disclosure;

FIG. 4-*a* illustrates a format of an embodiment of a secure data document having a secure header and secure document according to the principles of the disclosure;

FIG. 4-*b* illustrates a format of an embodiment of a Secure SMS Message according to the principles of the disclosure;

FIG. 5 illustrates a flow diagram of an embodiment of a process 500 to process a request command from a SDE Client and return associated response to the SDE Client processed by the SDE DTA;

DETAILED DESCRIPTION

The present disclosure is directed to a system, apparatuses and methods that provide an effective and efficient system/method/scheme to securely exchange data among two or more users or entities and certify the originator and recipient without the need of a static digital certificate that is subject to both fraud and theft. A Secure Data Exchange (SDE) system is disclosed wherein a recipient is authorized by an originator to access the originator's data using a unique virtual dynamic key (VDK) and a plurality of other converters such as a MSC ID. The MSC ID allows the originator to convert data and the recipient to reverse the conversion (e.g., an algorithm for converting and a related algorithm used to reverse conversion). A VDK is associated with each communication between an SDE Client associated with a User and a Data Transaction Administrator (DTA). The communication is over a communication network, such as the Internet, and employs a static address of the DTA such as the static IP address of the DTA. An SDE Client and a DTA will be discussed further below.

A converter is a numeric string with associated set of algorithms, wherein a set can consist of one or more algorithms. For example, a single algorithm to encrypt/decrypt data associated with VDK or a plurality of algorithms for data conversion associated with a MSC ID. In the case of a plurality of algorithms, an algorithm can be null function (no operation). The set of algorithms can be selected using any mathematical onto-function, such as a mapping function.

A plurality of converters, such as a randomly generated document dynamic key (DDK) and a MSC ID, is associated with each Data Transaction ID which is applied to a document to validate the document created by the originator. Data as used herein includes text, audio and video content. The data can be defined using extensions, such as ".doc" for word document, ".pdf" for PDF Document, ".avi" for video document, ".jpg" for image document, ".wav" for audio document or other extensions that correspond to programs used to generate the data. Secure data refers to data that has been created or converted from original data using a plurality of converters associated with the originator of the secure data. The plurality of converters includes MSC algorithms and DDK. The secure data is identified by an extension. For example, secure data can be a secure document, such as an SDE document that has been created using the plurality of converters associated with the data transaction ID that corresponds to the originator and identified with the extension ".sde". SDE document is used throughout the disclosure as an example of secure data. A secure message or secure electronic mail is another example of secure data. A secure message or electronic mail can include an attached secure document.

Figure 8:
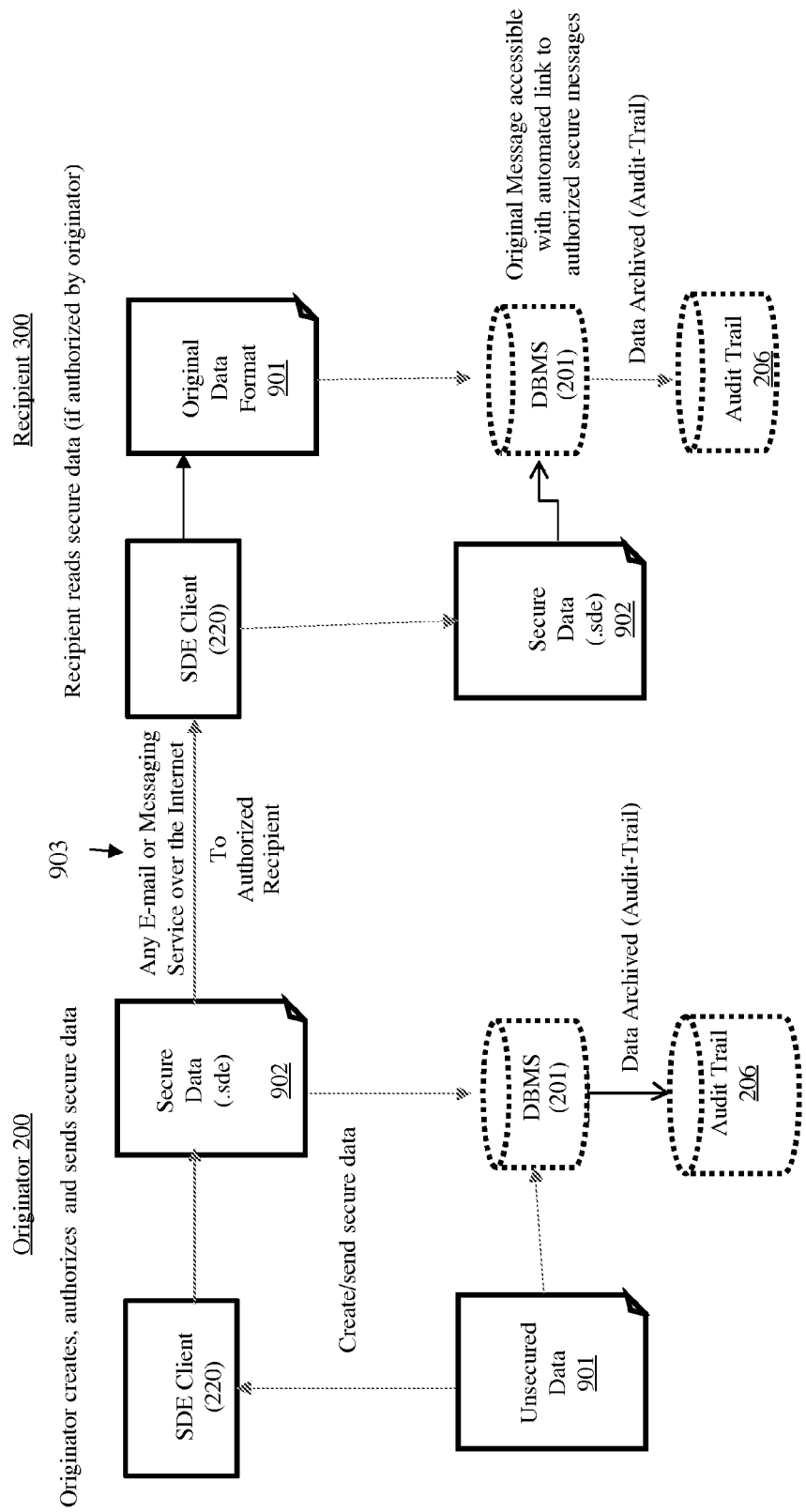
FIG. 8 illustrates a flow diagram of an embodiment of a method of transmitting secure data from the Originator 200 to the Recipient 300.

The disclosed embodiments overcome typical security issues by providing a SDE system for message security that mimics a private virtual tunnel (i.e., a direct virtual link) between a message originator and a message recipient as shown, for example, in FIG. 8. The SDE system can be a distributed system that employs multiple components to manage security, control access and protect privacy. The various embodiments disclosed herein provide improvements to message security and existing security technologies without the need of digital certificates. For example, the disclosed embodiments can provide: secure data exchange between an authenticated originator and authorized recipients that are authorized by the originator, preserve secure private tunnel integrity (e.g., a direct link) with proprietary access control, enhanced authentication in real-time with the access control and privacy, end-to-end security and hidden content identification that compares to private communication between two parties because it cannot be accessed by a third party without having the originator authorize access to the third party. The disclosure provides embodiments that provide essentially private communication since a secure data document cannot be traced back to the originator or the authorized recipient because neither the originator's nor the recipient's user ID, for example, is received with the delivered secure data. In some embodiments, the disclosed SDE system enables the self-destruction of exchanged data, such as text or voice, after the data has been accessed by the authorized recipient. As such, some embodiments provide for off-the-record conversation wherein a recipient is prohibited from copying or saving the originator's message. Accordingly, various disclosed embodiments can satisfy the strict Health Insurance Portability and Accountability Act (HIPAA) standards used in the health care industry.

As noted above, one function disclosed herein is to mimic private communication among two or more entities by allowing a self-destruct function to destroy a document or message. In different embodiments, the self-destruct function can be done upon creation of the secure document by the originator at the originator's device or upon access and review by the authorized recipient on the recipient device. Additionally, the plurality of converters associated with a secure document can be destroyed. This can be done at both the SDE Client upon creation/access of the secure data and the SDE DTA upon access of the plurality of converters by the recipient authorized by the originator.

In some embodiments disclosed herein document security can be increased by employing a plurality of DDK and a set of Mask Scramble and Compression (MSC) algorithms, identified by an MSC ID, to secure an unsecure data. Yet in another embodiment, the present disclosure provides a transparent, secure functionality in the exchange of e-mail, SMS text, video and audio by authenticating the originator and recipient(s).

The disclosure advantageously creates secure documents by converting an original document generated by a first program to a secure document with a secure data exchange extension, e.g., ".sde". The creation and receipt of secure ".sde" documents is transparent to the user's environment. Thus, a user can create documents from various programs and the SDE system can transparently convert the document to an ".sde" document that can be securely transmitted to recipients. Another extension besides ".sde" can be identified and programmed to be used.

Figure 1:
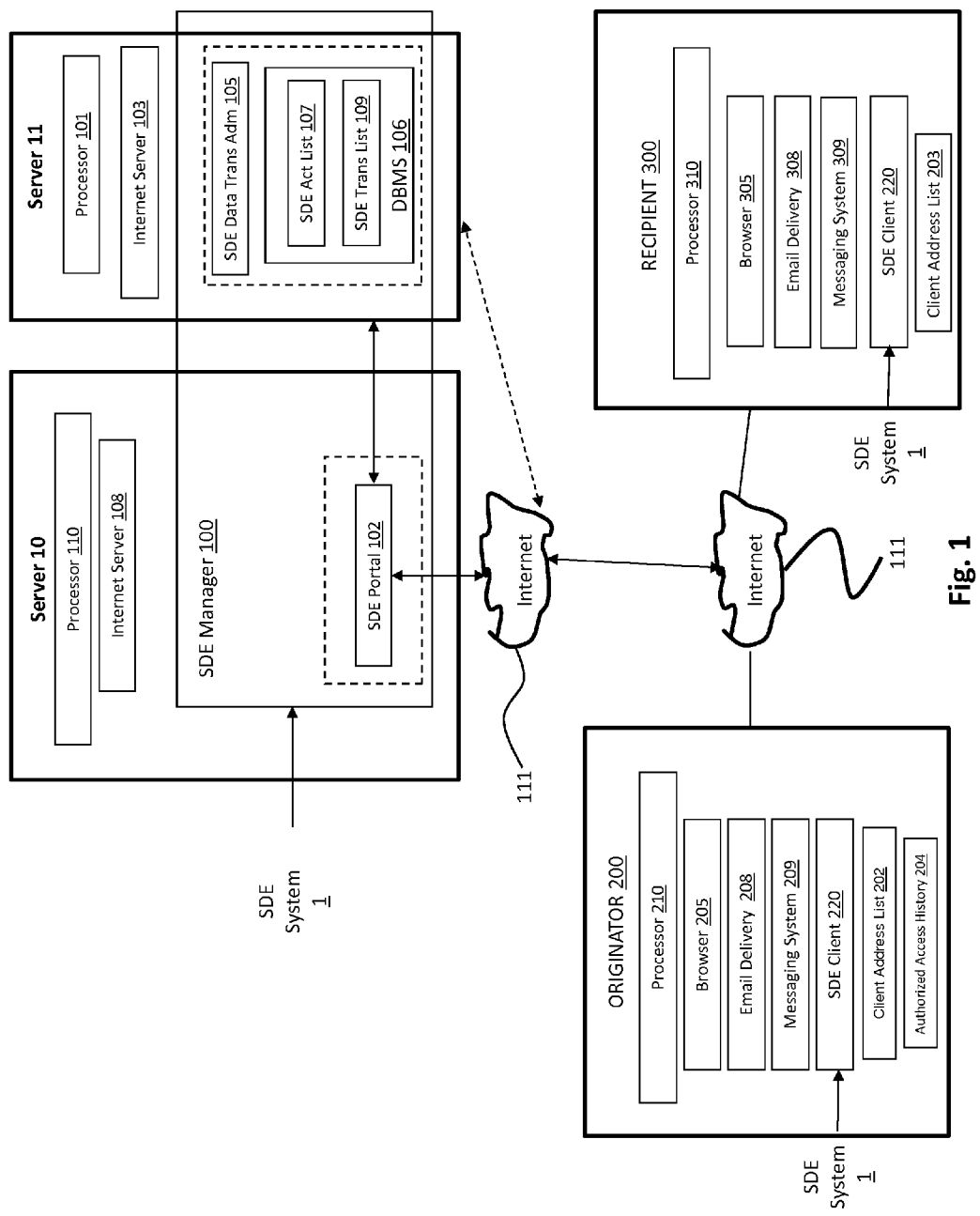
FIG. 1 illustrates a system diagram of an embodiment of an SDE system constructed according to the principles of the disclosure.

Turning now to the Figures, FIG. 1 illustrates a system diagram of an embodiment of an SDE system 1 constructed according to the principles of the disclosure. The SDE system 1 includes an SDE manager 100 and a SDE client 220. The SDE system 1 is a distributed system wherein the various components are implemented on different computing devices that are coupled together. The computing devices can be coupled together via a network, such as the Internet 111. In some embodiments, the SDE system 1 can be coupled together via other computer or communication networks that allow the communication of data between users. For the SDE system 1, portions of the SDE manager 100 are located on server 10 and server 11. In other embodiments, each component of the SDE manager 100 can be located on a single computing device, such as the server 10, or on more than two computing device. The SDE client 220 is located at an originator device 200 and a recipient device 300 in FIG. 1. The originator device 200 and the recipient device 300 represent multiple devices that can be used with the SDE system 1, wherein each of the devices would have the SDE client 220.

The Servers 10 and 11 include conventional components or hardware typically included on a server that is configured to communicate via the Internet 111. For example, the Servers 10 and 11 include Internet servers 108 and 103, respectively. The Servers 10 and 11 also include processors 110, 101, that include hardware, software or a combination thereof to provide the necessary functionality of a server, such as a conventional server. The Servers 10 and 11 can include additional components that are typically included in a server, such as a power supply, communication interfaces and a memory.

In one embodiment, the SDE manager 100 or portions thereof is implemented as a series of operating instructions stored on a local or built-in memory of the Servers 10, 11, or loaded during start-up into a memory associated with the Servers 10, 11 that direct the operation of the processors 110, 101, respectively. As such, the processors 110, 101 can include the additional functionality disclosed herein from the SDE manager 100.

The originator device 200 and the recipient device 300 can be conventional computing devices. For example, the originator device 200 and the recipient device 300 can be smart phones, computing pads, laptops, desktops, etc. The originator device 200 and the recipient device 300 can be various computing devices having the necessary hardware, software, or combination thereof to communicate via a network. The originator device 200 and the recipient device 300 include processors, browsers, electronic mail delivery systems and messaging systems. Each of these can be conventional systems typically employed in computing devices. For example, the electronic mail delivery system and the messaging systems can be conventional electronic message delivery systems that are used by various computing or communication devices. The various electronic message delivery systems are referred to herein as generic electronic message delivery systems. In FIG. 1, the originator device 200 includes the processor 210, the browser 205, the email delivery system 208, and the messaging system 209. In FIG. 1, the recipient device 300 includes the processor 310, the browser 305, the email delivery system 308, and the messaging system 309. Both the originator device 200 and the recipient device 300 also include a client address list that is denoted 202 and 203, respectively in FIG. 1. The client address lists 202,203, can be an address book similar to one used in any e-mail system containing at least a Name, E-Mail Address and Phone number of clients. The originator device 200 also includes an Authorized Access History 204 that is configured to provide a history of authorized access of secure data by recipient(s). Though not illustrated in FIG. 1, the Authorized Access History 204 can be part of the SDE Client 220 and can be further updated by the SDE Client 220 using a request/response with the recipient(s), such as the Request/Response 440/465 with a recipient(s) time stamp of access of secure data as presented in FIG. 3. The SDE Client 220 may be modified to automatically update an Authorized Recipient History with recipient data operation status when accessed with Time Stamp using Request/Response CMD 440/465 with a User ID (UID), Originator Data Transaction ID (ODTID) and Requestor ID (RID). Since SDE DTA 105 deletes the plurality of converters upon access by each authorized Recipient, additional time limit may be added to keep Originators secure Data inaccessible after certain time period. Furthermore, SDE Client 220 may be set up by saving authentication code and verify PWD, PIN locally by creation of VDK and new authentication code and matching with the saved authentication code. As noted with respect to FIG. 2, the SDE Client 220 may also include an Audit Trail History 206.

The originator device 200 and the recipient device 300 are also referred to herein as the originator 200 and the recipient 300. The originator 200 and the recipient 300 are synonymous with "user", "client", "entity" and "SDE Account Holder" unless otherwise specified. Originator refers to a client who uses SDE Client 220 to create secure data and authorizes one or more recipient(s). A recipient is a user who receives the secure data and an authorized recipient is authorized by the originator to access the secure data.

The SDE manager 100 includes a SDE portal 102 and a SDE Data Transaction Administrator (DTA) 105. The SDE manager 100 is configured to provide a website for access to employ the SDE system 1 for communicating secure data. The SDE Portal 102 is a communication portal configured to provide the access to the SDE manager 100 by a user, such as the originator 200. The SDE portal 102 is configured to allow a user to sign-up and create a SDE account, confirm e-mail address of the user, provide access to the SDE Client 220, set-up a credit line or make payments for secure data service. Through the SDE portal 102, users can register with the SDE system 1. In one embodiment, the SDE portal 102 is configured to receive registration information from a user over a network and send an electronic confirmation message to the user over the network in response thereto. In one embodiment the electronic confirmation message provides electronic access to the SDE client 220 for loading on an electronic device, such as the originator 200 or the recipient 300. The electronic access can be a link for download. In other embodiments the SDE Client 220 may already be on a computing device and does not need to be downloaded but needs to be activated. As such, a set-up program may be provided to a user such as discussed with respect to FIG. 2, which provides interaction with the SDE Portal 102. The SDE Client 220 can be implemented on a dedicated logic circuitry, such as on a chip or microchip, and added in the computing device at manufacturing or as an add-on.

The SDE DTA 105 is located on the Server 11 with Processor 101 and Internet Server 103. The SDE portal 102 sends a user's sign-up or registration data to the SDE DTA 105. All of the SDE manager 100, including the SDE portal 102 and the SDE DTA 105, can be located on the same server. Having the SDE portal 102 and the SDE DTA 105 separated on different computing devices, however, provides enhanced security and allows the SDE portal 102 to handle the initial sign-up or registration of users with a separation to the SDE DTA 105. After initial sign-up, registered users may communicate with the SDE DTA 105 directly over the Internet using the static IP and the Internet Server 103 as indicated by the dashed line in FIG. 1. In some embodiments, a computer without an Internet server can be used instead of Server 11 with a dedicated connection to the SDE portal 102 to provide reduce access to the SDE DTA 105 and provided additional security.

The SDE DTA 105 is configured to activate access of the user to the SDE manager 100 based on an authentication code generated from an e-mail address, a password and a pin provided by the user. The SDE DTA 105 is also configured to generate a unique account number for the user after activation and thereafter verify the user has the access based on both the unique account number and the authentication code. The SDE DTA 105 is further configured to provide a unique converter or converters to the SDE client 220 of a verified user in response to a request therefrom.

An authentication code refers to a two-step process wherein: (1) a unique ASCII code is created using a user's e-mail address and other parameters or values only known to the SDE DTA 105 and the SDE client 220 and (2) then encrypted using VDK. VDK is a symmetric key to encrypt/decrypt data created using static symmetric key, MSC ID and in some embodiments may be derived using any function to obtain a numeric value from a user's e-mail address, password (PWD) and pin (PIN) that are known or only known to the SDE DTA 105 and the SDE Client 220. A user can enter the PWD and PIN at the originator 200 or recipient 300 via the SDE client 220.

Virtual System Dynamic Key (VSDK) can also be created using the same method used to create VDK without employing the PWD and/or the PIN. A user's PWD and/or PIN may be validated locally by the SDE client 220 by creating a new VDK and determining if the new VDK matches with the VDK created during activation of the SDE client 220. See for example step 219d of FIG. 2. If the VDK matches, then the user is validated. Otherwise the user most likely have entered an invalid PWD or PIN. The PWD and PIN refer to user defined identifiers that include any printable ASCII codes of length set up by the SDE Client 220 to be used to create the authentication code and the VDK.

The DBMS 106 can be configured as a conventional secure database. DBMS 106 refers to any database management system to manage entries into an SDE Account List 107 or SDE Transaction List 109 used by SDE Portal 102 or SDETA 105. In one embodiment, the DBMS 106 is operable with or via XTML.

Figure 2:
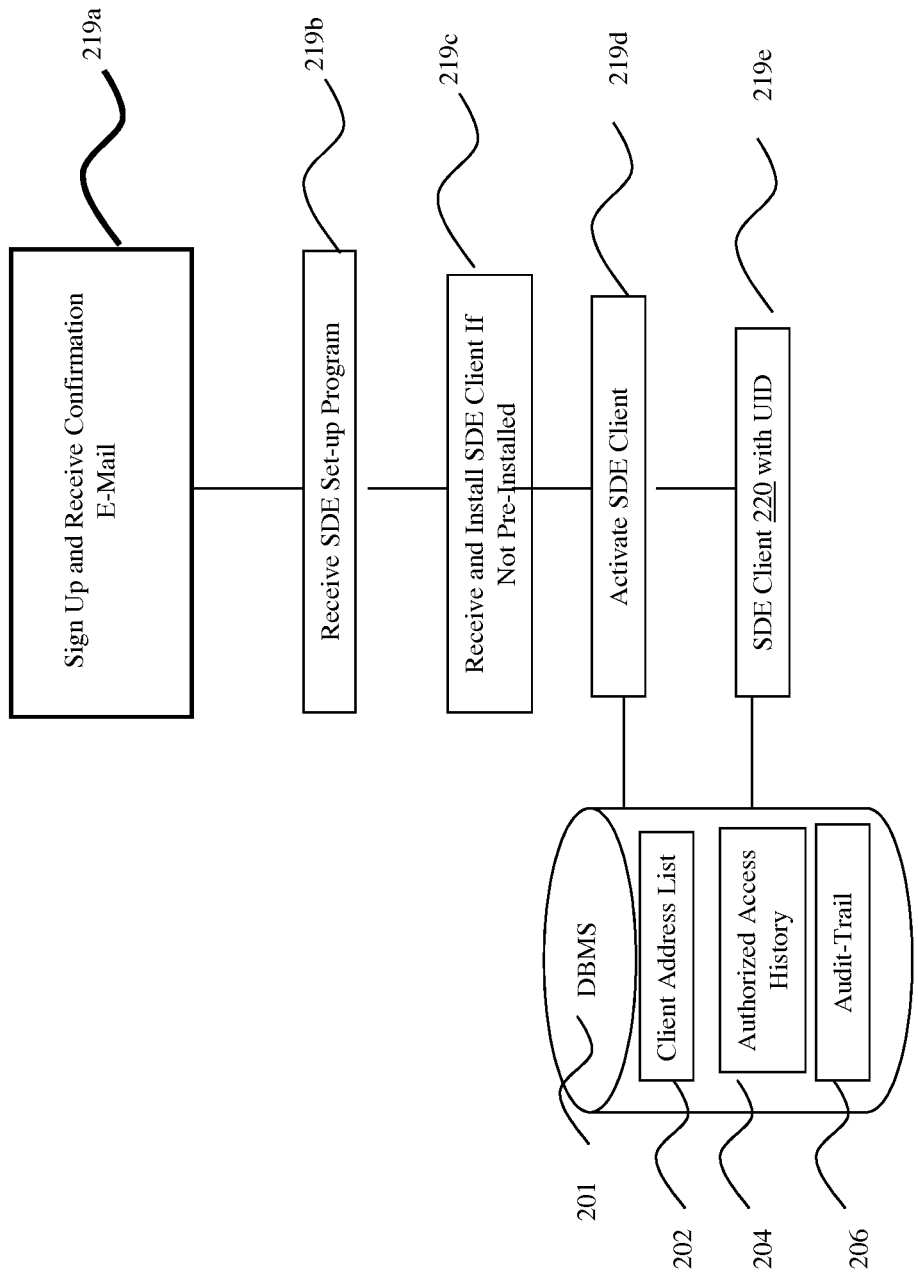
FIG. 2 illustrates a flow diagram of an embodiment of a method for accessing and registering with a SDE system carried out according to the principles of the disclosure.

FIG. 2 illustrates a flow diagram of an embodiment of a user accessing and registering with a SDE system, such as the SDE system 1, carried out according to the principles of the disclosure. Through the method of FIG. 2, a user can receive an SDE Client from an SDE Portal and install it with a UID and empty Client Address List and Authorized Access History. The SDE Client can also be already loaded on a computing device and activated as discussed with respect to FIG. 2. In the discussion of FIG. 2, the SDE client 220 and the SDE portal 105 of FIG. 1 are referenced for explanation. Additionally, a user can be the originator 200 or the recipient 300. For ease of explanation, the originator 200 may be used in part of the discussion.

In FIG. 2, a user (e.g., the Originator 200 or Recipient 300) accesses the SDE Portal 102 using Browser 205. Upon Sign-Up, the user registers with the SDE Portal 102 to download the SDE Client 220. Also upon Sign Up by the user, the SDE Portal 102 sends request to SDE DTA 105 to create an entry in the UserAct List 107 of the DBMS 106 having a unique Act ID, Name, E-Mail Address, Password, PIN, SDE Client Type, Transaction ID, Originator Counterset (CTR), Setup CTR, Access CTR, VDK, MSC ID and Status. Furthermore, the SDE Portal 102 sends a confirmation e-mail in a step 219a that is received by the user to confirm email with a link to verify e-mail address associated with the user. SDE portal 102 activates the users account via a communication using inter-process communication with the SDE DTA 105 which sets activation date of the user. The user is then allowed to download the SDE Client 220 set-up program using the download link provided to the user via an e-mail sent from the SDE manager 100, e.g., the SDE portal 102, during sign-up by the User. Upon download of set-up program as noted in step 219b, the set-up program determines if the SDE Client 220 is pre-installed in the particular computing device. If not, the set-up program downloads the SDE Client 220 using embedded link provided in the setup program and installs the SDE Client 220 to a desired folder in a step 219c. In a step 219d, the SDE Client 220 is activated. The user can activate the SDE-Client 220 using a pre-assigned PWD/PIN employed during registration or create a new PWD/PIN during the initial activation. In case user creates PWD and PIN at SDE Client 220 instead of during registration, SDE Client 220 requires using a unique VSDK known by or only known by the SDE Client 220 and the SDE DTA 105 to securely exchange activation command. However, if the SDE Portal 102 does not allow to set PWD and PIN during registration, the SDE DTA 105 is unable to create VDK to authenticate the User's authentication code created at the SDE client 220. In this case SDE DTA 105 will return an error message to the SDE client 220 to re-initiate the activation command using VSDK. SDE Client 220 in response to an error message recreates activation command using VSDK. Thereby, SDE DTA 105 can recover secure data, obtain PWD and PIN to build VDK and authenticate User's authentication code created by the SDE Client 220.

User can access the product by using e-mail address, PWD and PIN provided to the SDE Portal 102 during registration (Sign Up) or set by the User during the activation in step 219d. During communication with SDE Client 220 and SDE DTA 105, a VDK uniquely associated with each user's data (e.g., E-Mail Address, PWD and PIN) is created using VDK and Mask and Scramble algorithm identifier (MSC ID) to secure/unsecure specific data along with creation of authentication code uniquely associated with each user.

Note that the Originator 200 or Recipient 300 may be pre-loaded with the SDE Client 220 in the device on physical memory such as smartphone or separate memory chip (micro chip) that is defined in the device registration (e.g., on Windows Registry file) such that SDE Document access is linked to SDE Client 220. If not pre-loaded, the SDE Client 220 is independent of use from any device. VDK is fixed with the SDE Client 220 but VDK may be changed during the use of a Create and Send CMD, such as Create and Send CMD 420, provided an additional Validate command is added and used before using a Create and Access CMD, such as Create and Access CMD 430, to modify creation of VDK and authentication code. In some embodiments, dynamic key references refer to Advanced Encryption Standard (AES) with 256 bits key size that has been adopted by the U.S. government and now used worldwide. However, other algorithms may be used and associated with Virtual and Data Dynamic key if desired. The plurality use of VDK and associated algorithm with MSC ID further improves security of communication with SDE Client 220 and SDE DTA 105.

SDE Client 220 interfaces in a step 219e with user using graphical interface to create/access secure data such as a secure SMS Message and communication with SDE DTA 105. Other interfaces can also be used such as a browser operable with XML data, such as date records, wherein the SDE Client 220 is an add-on or plug-in. Client Address List 202 can be an Address book similar to one used in any e-mail system containing at least Name, E-Mail Address and Phone number of Clients. Authorized Access History 203 provides history of authorized access of secure data document(s) or secure SMS message to Recipient(s) that can be further updated by the SDE Client 220 using a Request/Response 400/450 with the Recipient(s) Query/time stamp (441/446) of access of secure data as noted in FIG. 3. Note that an additional Query CMD may be added as required using request/response (400/450). DBMS 205 refers to any database management system integrated with SDE Client 220 or a conventional DBMS located at the computing device or a computer system to manage a Client's Address List and Authorized Access History, such as the Client's Address List 202 and Authorized Access History 203 of FIG. 1. The DBMS 205 can also be operable with or through XTML. The Authorized Access History 203 can be a part of the SDE Client 220 in some embodiments. Additionally, an Audit Trail 203 can be part of the SDE Client 220. The Audit Trail 203 may be dictated by a company's policies and/or government standards such as by HIPAA.

FIG. 3 illustrates formats of embodiments of a request command (Request CMD) 400 and a response command (Response CMD) 450 according to the principles of the disclosure. The Request CDM 400 and the Response CMD 450 are used between the SDE Client 220 and the SDE DTA 105 to setup the transaction data by the Originator 200. The transaction data is used to authorize one or more recipients using the Client List 202 containing recipient(s) identified by e-mail addresses and assigns an Originator Data Transaction ID (ODTID) with associated plurality of converters (e.g., DDK and MSC ID) to apply to originator's document assigned by SDE DTA 105. The use of a plurality of converters such as DDK and algorithms associated with each MSC ID allows the application of Mask, Scramble and Compression (MSC) of data and DDK that further improves the security of data. The MSC ID refers to associated algorithms for MSC. The MSC ID and associated DDK are examples of converters and can be referred to herein as MDDK. Employing a plurality of converters provides increased security wherein even if one of the converters is discovered by an unauthorized user, the unauthorized user still does not know the other applied converter or the order of application. As such, the secure document is essentially unbreakable unless the recipient is an authorized recipient. The first row 401 of the Request CMD 400 and the first row 451 of the Response CMD 450 provide the column headings for the commands. Row 401 includes command (CMD) Type 402, CMD Flag 403 and User ID 405. The data type 407, Recipient Email List 408 and are also noted. The various elements of the Request CMD 400 and the Response CMD 450 are discussed below with respect to the illustrated methods.

Upon receipt of response 450 of Request 400 to create secure data, SDE Client 220 creates a new document with extension ".sde" that includes: 1) SDE Document Header identifying the document with Originator's SDE UID, 2) Originator Data Transaction ID (ODTID), 3) extension of Document, Document Name and secure document converted to original format (using algorithm associated MSC ID and DDK associated with ODTID). SDE Client 220 also creates an authorized access history using request/response 441/466. Note that a plurality of converters, such as DDK and MSC ID, may be created by the SDE Client 220. In this case the SDE Client 220 can use modified 420/455 commands (e.g., 420a/455a) by sending the plurality of converters (e.g., DDK and MSC ID) in request CMD 420a to SDE DTA 105 and receive response 455a with ODTID to create secure data header 520 as noted in FIG. 4-a.

FIG. 4-a illustrates a format of an embodiment of a secure data document having a secure header and secure document according to the principles of the disclosure. This document with UDN and extension ".sde" is created by Originator 200 using SDE Client 220 using user interface similar to any e-mail system (selecting Data Type, Recipient(s), Document Attachment(s) and/or Text Message) and sent by Originator 200 to Recipient 300 using any e-mail delivery system (similar to sending any other documents). When the Recipient 300 receives a document with ".sde" extension via E-mail, SDE Client 220 is invoked to open this document because during the installation of SDE Client, it was defined in the target computer system, such as recipient 300, to open document with ".sde" extension using target application SDE Client 220. SDE Client 220 first obtains OID 527 and ODTID 525 from the Document Header 520 and then sends Access Request CMD 430 to SDE DTA 105. The recipient 300 is provided with DDK and MSC ID in Response 460 if Recipient 300 is authorized by the Originator 200. Upon receipt of DDK and MSC ID from the SDE DTA 105, the SDE Client 220 converts secure document 537 into original format and displays document or invokes target application to display original document and document name 535 using extension 530 in the Data Header associated with secure data. In case of Data Type returned in Response is "S"(Self-Destruct), the SDE Client 220 destroys the trace of Data of the Document. Note that DDK is destroyed upon access of DDK and MSC ID upon Response 460.

Additional security to secure and unsecure Document Header 520 may be added to further enhance security by using embedded MGDK (Global Mask ID and dynamic key) accessible by both Originator and Recipient SDE Client 220.

The FIG. 4-b illustrates a format of an embodiment of a Secure SMS Message (SM) 550 according to the principles of the disclosure. The secure SM 550 includes a Secure SMS Header 560 and secure message 570. The Originator 200 creates a secure SM 550 using SDE Client 220 with a user interface by selecting Recipient E-Mail Address from Client Address List and entering short Text Message, creating Secure SMS Message using the Request/Response CMD 420/455 and sent by Originator 200 with Recipient phone number from the Client Address List 202 associated with Recipient E-Mail Address to Recipient 300 using any SMS Text messaging system interface. When Recipient 300 receives a Secure SMS Message via messaging system, SDE Client 220 is invoked to open this SMS message because during the installation of SDE Client 220, it was defined in the target computer system to open Secure SMS Message identified by SMS ID 561 by invoking SDE Client 220 or SDE Plug-in as Internet explorer add-on to activate SDE Client 220 directly to create/access an SDE Document. The plug-in can be run under a browser and be independent of the User Interface; it can be written in C or C++ programming language and can be recompiled on any target processor and machine code can be created to be available to run on target processor. SDE Client 220 converts the Secure SMS Message 565 by Processing Access Request CMD 430 using the Secure SMS Header 560, which includes the SMS ID 561, NCC 562, ODTID 563 and OID 564. SDE Client 220 provided with MDDK (DDK and MSC ID) in Response 460 if Recipient 300 is authorized by the Originator 200. Upon receipt of MDDK, SDE Client converts Secure Message 565 into original Text Message and displays Text Message. In case of Data Type returned in Response is "S" (Self-Destruct), the SDE Client destroys a trace of the Text Message. Since SMS Text Message cannot contain null character resulted from the process of creation of Secure SMS Message, NCC (null character control) 562 is used to substitute control character with null character before converting Secure Text Message into the original text message.

Turning now to FIG. 5, a flow diagram is illustrated of an embodiment of a process 501 to process the Request CMD 400 from User SDE Client 220 and return associated Response 450 to SDE Client 220 processed by SDE DTA 105. Note that one or more documents may be secured using DDK and MSC ID associated with User ID (UID) and User's sequential Data Transaction ID. The method 501 begins in a step 600 wherein the Request CMD 400 is received by the SDE DTA 105. In a step 601, the received command, Request CMD 400, is logged with the IP address.

In a step 605, the Request CMD 400 is validated by checking the format of 410. If the Request CMD 400 is validated the method 501 continues to step 610 wherein the user is validated. In one embodiment, the user is validated by loading the user's Act List record (UALC) for UID (405) from the DBMS 106. If found in the DBMS 106, the Secure Data 410 of the Request CMD 400 is converted using VDK from the UAL and the Authentication in 410 is validated with the associated Authentication of UALC. If validation fails in step 605 or 610, the process 500 continues to set Status to Error Code wherein operations 678 and 680 are performed.

Turning now to step 615, a determination is made as to what type of request command has been received. If an access CDM, the method 501 continues to step 620 where the access command is processed. In one embodiment, the access command is processed by locating a transaction database record of originator SDE Acct ID with user's email address and originator data transaction ID. If not found, the method 501 continues to steps 678 and 680 where the status is set to error code. If found, the processing can continue by extracting the MSC ID, data type and DDK and creating a response 460. Additionally, the MSC ID and DDK can be removed, the timestamp updated and the data operation accessed. Additionally, the transaction database record can be updated. If status is success, the originator's UALC associated with OID from DBMS 106 can be loaded.

After creating the return response 460, the return response 460 is sent to the originator in a step 640. The DBMS 106 is then updated in a step 660. For example, the UALC can be updated with an access counter.

Returning back to step 615, if the received request command is a create CMD, the method 501 continues to step 630 a response CMD is created. In one embodiment, the Response CMD 455 is created by incrementing the Data Transaction ID of the user's account associated with UID 405, creating a random DDK and randomly selecting the MSC ID from a set of MSC ID, creating a SDE Transaction List Record 109 using DBMS 106 for each recipient with originator ID (OID), recipient email address, data transaction ID, doc type, data operation (Created, Authorized or Accessed), MSC ID, DDK and timestamp. In one embodiment, the SDE DTA 105 performs step 630. In other embodiments, a portion of the step 630 may be performed by the SDE client 220. For example, the SDE Client 220 may create the random DDK and randomly select MSD ID locally by providing control of DDK and MSC ID locally and send CMD 420 with DDK and MSK ID that can be used by the SDE DTA 105 to associate with Create CMD associated with User's E-mail Address. In this case SDE DTA 105 can create response 455 with only Unique ODTID and UOID with status Success.

In a step 650, the created Response 455 is sent to the originator 200. The DBMS 106 is then updated in a step 670. In one embodiment, the DBMS 106 is updated by updating the UALC with data transaction ID and update the originator and setup counters.

Figure 6:
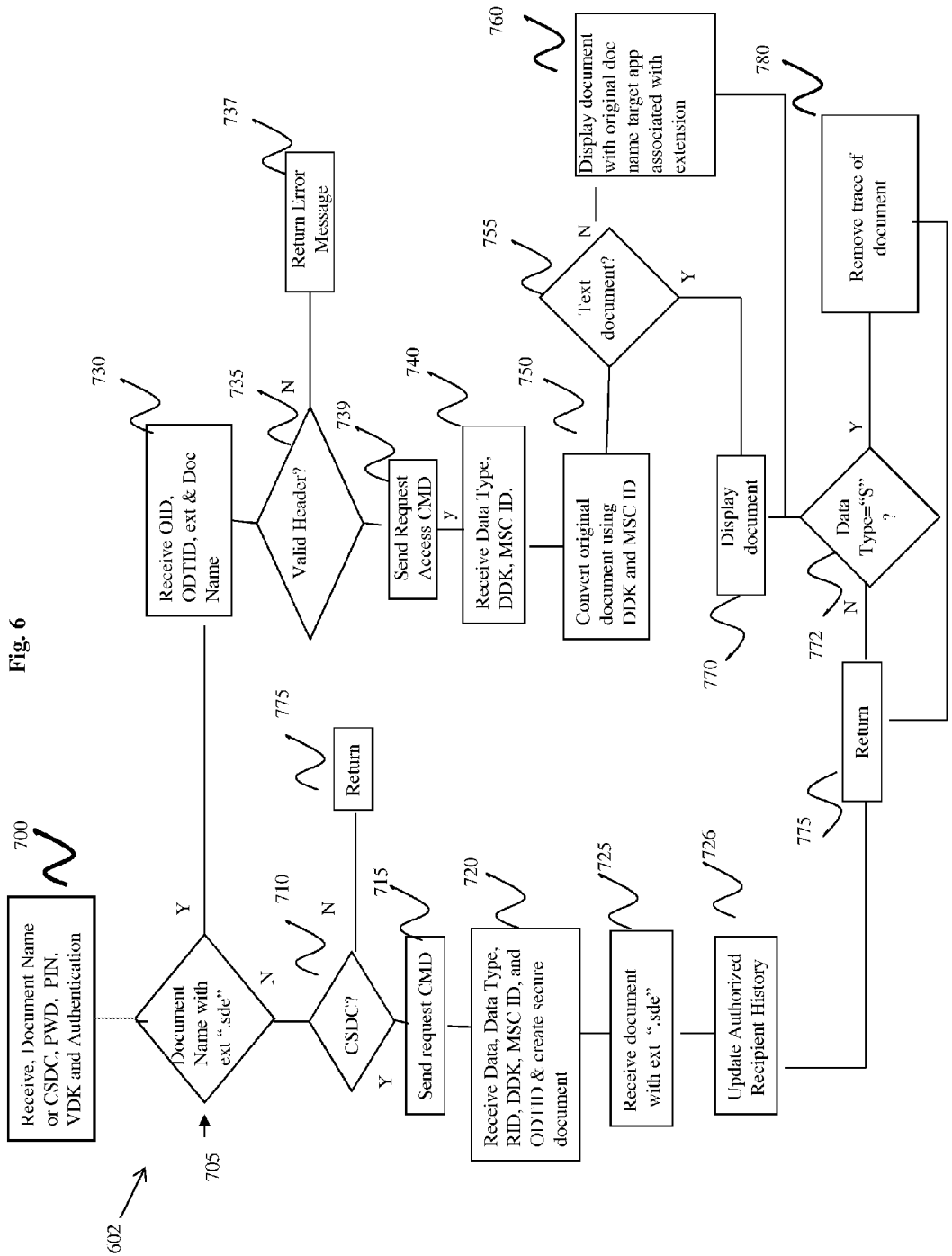
FIG. 6 illustrates a flow diagram of an embodiment of a processing operation of a drag/drop operation performed by a SDE Client 220 receiving a document with secure data with ".sde" extension or a standard document with no other extension.

Turning back to step 615, if determination is made that the received command is a time stamp query or an activate command, the method 501 continues to step 635 wherein the received command is processed. Generally there are two types of commands that are communicated, query and set-up. A Query/time stamp is an example of a query command and a activate command is an example of a set-up command. In one embodiment, the Query/time stamp command is processed by locating the transaction list record using the DBMS 106 of OID, ODTIM and RID. If transaction data operation is accessed by authorized recipient, a response to accept the time stamp is created and sent in step 655; else the status is set to error code. If status is set to Error Code, then the method continues by sending the response back to User in a step 680. Note that an additional Setup or Query CMD may be added to request/response 400/450 as required FIG. 6 illustrates a flow diagram of an embodiment of a processing operation 600 of a Drag/Drop operation performed by a SDE Client 220 receiving a document with secure data with ".sde" extension or a standard document with no other extension. The method 602 begins in a step 700.

In step 700, the SDE Client 220 receives document or CSDC, PWD and PIN from User, creates Authentication code and VDK using E-Mail Address, PWD, PIN used by the SDE Portal 102 uniquely associated with each User.

In a step 705, a determination is made if the document name has an ".sde" extension. If so, the method 602 continues to step 730 wherein the SDE Client 220 receives the SDE document (with extension ".sde") which contains a Secure Document Header and Data from the User. The SDE client 220 validates the Document Header 520 in a step 735 and if valid continues to step 740. Otherwise, the method 602 continues to step 737 wherein an error message is displayed to the User.

The SDE client also receives the OID 520 and the ODTID 525 in step 730 and sends Request Access CMD 430 with secure Data using VDK to SDE DTA 105 in a step 739. Upon processing by the SDE DTA 105, the SDE client 220 receives DDK, MSC ID and "Doc Type" in a step 740. The next step 750 converts the secure data to the original document name, extension and document attached to Document Header of secure data using MDDK 545 (or using plurality of converters). A determination is made in a step 755 if the extension of the original document is ".txt" or not. If not, the SDE client 220 invokes the application that processes the target application (i.e., original application) such as PDF Viewer (if ".pdf" document) and displays the converted document in a step 760. If a ".txt" extension, the converted document is displayed as a text message in a step 770.

After steps 760 and 770, the method 602 continues to step 772 wherein a determination is made if the "Doc Type" is "S" (Self-Destruct). If so, then upon closing the SDE Client 220 removes any trace of the secure data in a step 780. Note that the MDDK (upon access from SDE DTA 105), has been removed by the SDE DTA 105 meaning the document cannot be accessed again. If the "Doc Type" is not "S" then the method continues to step 775 where processing of the received secure document is completed by the SDE client 220.

Turning now back to step 705, if the received document does not have a document name with extension ".sde" the method 602 continues to step 710. In a step 710, a determination is made to or not to create secure data through a control to create a secure data process. The create secure data control (CSDC) can be invoked via user interface or sent by external calling process using Inter Process Communication received in step 700 input defined on the Target Client Computer System. If a determination is made to create the secure data, the User's SDE Client 220 receives the original document with extension, Doc Type and RID via user interface and sends the Request Create CMD 420 with secure data 410 using VDK to SDE DTA 105 in a step 715. Upon receiving Response 455 of Create CMD 420, the SDE client 220 receives Data Transaction ID, DDK and MSC ID from the SDE DTA 105 in a step 720 and creates the Document Header 520 and appends it with the secure data (document name, extension and document) using MDDK. The secure data document UDN with ".sde" is returned and stored in a step 725. In one embodiment, the secure data is returned to the same folder or (as shown later) if used as a control return file id to the Originator Process who invokes the control, i.e., the CSDC. The method 602 continues to step 726 where the authorized recipient history is updated. The method 602 then continues to step 775. The SDE Client can also be employed to communicate and process a SDE Data Transaction and create secure SMS messages with secure TEXT Message ID. A telephone number associated with the recipient may be used to send the SMS message.

Figure 7:
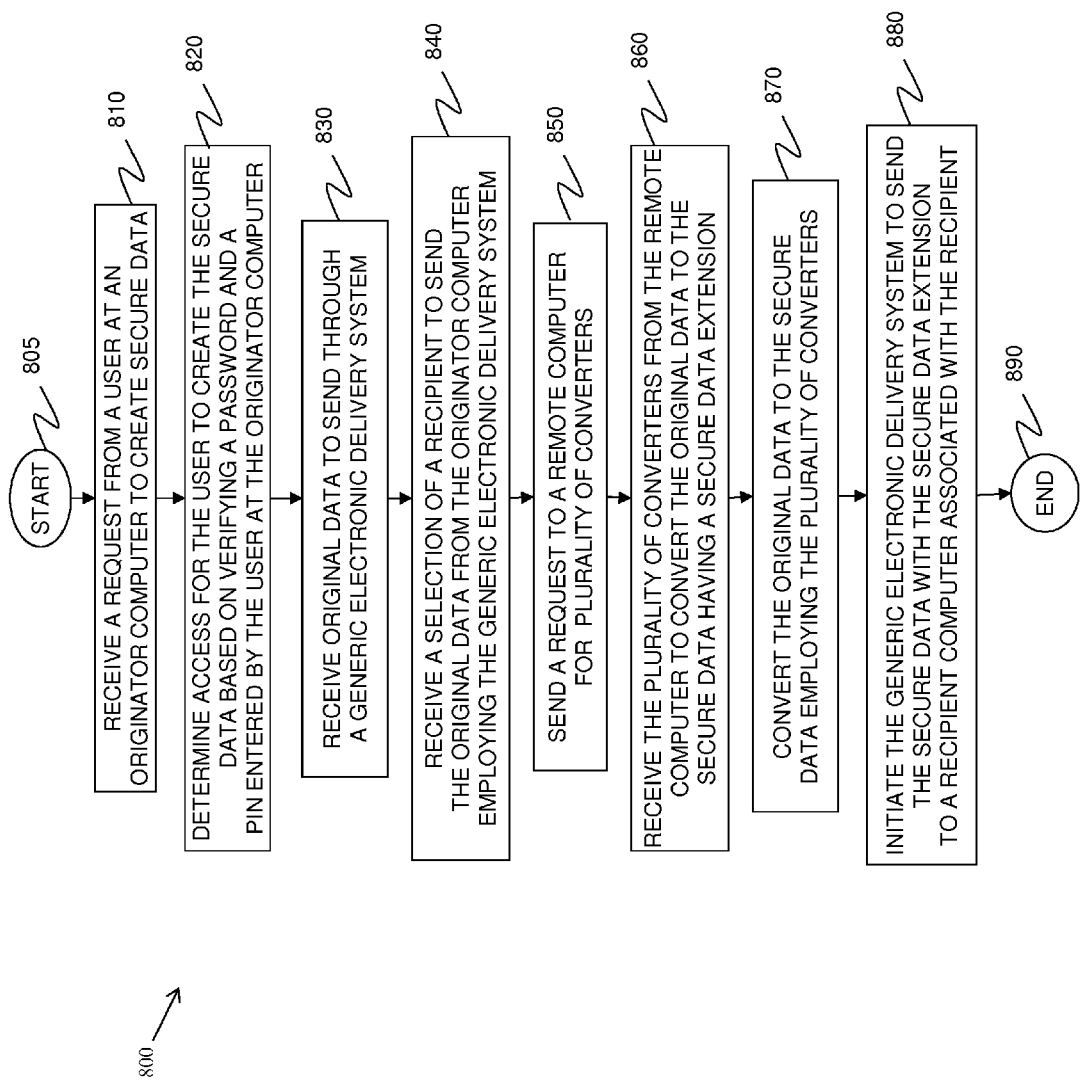
FIG. 7 illustrates a flow diagram of a method of communicating secure data through a generic electronic delivery system carried out according to the principles of the disclosure.

FIG. 7 illustrates a flow diagram of a method 800 of communicating secure data through a generic electronic delivery system. The method 800 can be used to send secure data from an originator to a recipient employing an SDE system, such as the originator 200, the recipient 300 and the SDE system 1 of FIG. 1. In one embodiment, each step of the method 800 is carried out by an SDE client, such as the SDE client 220. The method 800 begins in a step 805.

In a step 810, a request is received from a user at an originator computer to create secure data. The request can be received via a graphical user interface of the SDE client. In other embodiments, an audio interface or another type of user interface that allows the SDE client to communicate with the user can be used.

A determination is made in a step 820 if the user has access to create the secure data based on verifying a password and a pin entered by the user at the originator computer. The password and pin can be entered using a user interface of the SDE client.

After verifying the user, the original data to send through a generic electronic delivery system is received in a step 830. In one embodiment, the original data is already created and is selected via, for example, the user interface. The original data can be stored on the originator computer or can be accessible via the originator computer. In some embodiments, the original data is created using the user interface. The original data is non-secure data or unencrypted data.

In a step 840, a selection of a recipient in which to send the original data from the originator computer employing said generic electronic delivery system is received. Multiple recipients can be selected to receive the original data. The SDE client user interface can be used to select a recipient or recipients from a list. A recipient can also be entered via the user interface.

In a step 850, a request for a plurality of converters is sent to a remote computer. The plurality of converters is requested to convert the original data to secure data. The request can be sent to an SDE manager. In some embodiments, the request is sent to the SDE manager via an SDE portal. The request can be a request command such as Request CMD 420. In one embodiment the plurality of converters includes at least DDK. In another embodiment, the plurality of converters includes the DDK and a MSC or a MSC ID. The MSC can be stored on the SDE client and identified by the MSC ID sent by the SDE DTA with the DDK.

In a step 860, the plurality of converters is received from the remote computer. The remote computer can be the computer 11 of FIG. 1. The plurality of converters may be sent in a response command such as Response CMD 455. A portion of the plurality of converters may be local to the originator device and identified by the remote computer.

The original data is converted to the secure data having a secure data extension in a step 870. The plurality of converters is employed to convert the data. 13. In addition to converting the original document to secure data, the name of the document is also secured by creating an unidentifiable name for the secure data. Thus, when received, the recipient does not even know what kind of data has been received. The plurality of converters can also be used to generate the unidentifiable name.

In another embodiments according to the disclosure, the SDE Client 220 may be embedded with e-mail or messaging system where SDE Client control can be invoked by getting User PWD, PIN and passed on to SDE Client Control with a comma delimited recipient list and document to have SDE Client convert data into secure data using UDN (Unidentifiable Name) with extension ".sde". Since secure data is based on OID, ODTID and associated set of converters such as MSC ID, DDK, in some embodiments the plurality of converters can be used for more than one document or group of documents. By doing so, it may be useful in saving multiple transactions setup, resources and costs associated to manage multiple documents for a set of recipients.

In a step 880, the generic electronic delivery system is initiated to send the secure data with the secure data extension to a recipient computer associated with the recipient. The recipient computer is not limited to a single, dedicated computer associated with the recipient but can be any computer in which the recipient has access to the generic electronic delivery system. For example, the recipient may receive the secure data through an e-mail received on their smart phone, their laptop or their desktop at work. In order to access the secure data, however, the recipient computer will have to have the SDE client and the recipient will have to be an authorized recipient. The method 800 continues to step 890 and ends. The method 800 can be employed to send unsecured data 901 of FIG. 8 from the Originator 200 to the Recipient 300.

FIG. 8 illustrates a flow diagram of an embodiment of a method 900 of transmitting secure data from the Originator 200 to the Recipient 300. The diagram refers to various components of the SDE systems discussed herein and the interaction thereof to securely provide original unsecured data 901 to an authorized recipient, the Recipient 300. The unsecured data 901 can be accessed through the DBMS 201 such as in FIG. 2. The unsecured data 901 can be accessed employing the Authorized Access History 204 wherein a time stamp such as equivalent to certified mail is used to note when accessed. The accessed unsecured data 901 can also be archived to provide an audit trail. The unsecured data 901 can be archived in the Audit Trail 206.

The SDE Client 220 is employed to create secure data from the unsecured data employing the plurality of converters as disclosed herein and send the secure data. In one embodiment, therefore, the SDE Client 220 includes a user interface configured to receive input from the Originator 200 and provide information thereto and a secure communication controller. The secure communication controller is configured to generate authentication code associated with the user based on an email, password and pin provided by the user, employ a plurality of converters to convert the original unsecured data 901 to secure data 902 and direct a generic electronic mail system 903 to send the secure data 902, wherein the secure data 902 has a predetermined extension (.sde).

As noted above, the secure data is represented in FIG. 8 by the secure data 902. The generic electronic delivery system 903 is used to send the secure data 902 by which the Recipient 300 receives the secure data 902. The SDE client 220 of the Recipient 300 (via the SDE DTA 105 not shown) is used to determine if the Recipient 300 is authorized by the Originator 200 and if so converts the secure data 902 to the original data format to produce the original unsecured data 901. The unsecured data 901 can then be stored in the DBMS 201 of the Recipient 300 and archived in the Audit Trail 206 of the Recipient 300. The secure data 902 can also be stored in the DBMS 201.

Embodiments of the disclosure provide transparent functionality with Browser, e-mail or SMS text messaging system to exchange secure documents and authentications of entities by means of integrating SDE Client with User E-mail, Messaging System or Browser using SDE Client API or Controls to use User's Client E-Mail list and selection box to send e-mail using Secure Access or Secure Self-destruct messaging. Thereby creating, sending and accessing secure data, such as ".sde" documents is transparent to a user's environment similar to sending and accessing any another document such as ".pdf".

The disclosure provides an effective and efficient system/method/scheme to securely exchange data among two or more users or entities and certify the originator and recipient without the need of a static digital certificate that is subject to fraud and theft. The recipient is authorized by the originator to access originator's data using a unique virtual dynamic key (VDK) associated with each communication (using the Secure Data Exchange (SDE)) and a unique plurality of converters associated with each Data Transaction ID (which is applied to the document to validate the document created by the originator).

At least a portion of the above-described apparatuses, system or methods may be embodied in or performed by various conventional digital data processors, microprocessors, or computing devices, wherein these devices are programmed or store executable programs of sequences of software instructions to perform one or more of the steps of the methods, e.g., steps of the method of FIGS. 5-7. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods. Additionally, an apparatus, such as a server, a computer, a smart phone, a computing pad, a laptop, etc, may be designed to include the necessary logic circuitry, such as a chip or a microchip, or programming to perform each step or some steps of a method disclosed herein.

Portions of disclosed embodiments may relate to computer storage products with a non-transitory computer-readable medium that have program code thereon for performing various computer-implemented operations that embody a part of an apparatus, system, or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the present invention has been described in detail, those skilled in the art should understand that they can make various changes, substitutions and alterations herein without departing from the spirit and scope of the invention in its broadest form.

What is claimed is:

1. A secure data exchange (SDE) manager of a SDE system for the secure delivery of data between users, comprising:
a processor;
a SDE portal configured to receive registration information from a user over a network and send an electronic confirmation message to said user over said network in response thereto, wherein said electronic confirmation message provides electronic access to a SDE client for loading on an computing device; and
a SDE data transaction administrator (DTA) configured to activate access of said user to said SDE system based on an authentication code generated from an e-mail address, a password and a pin provided by said user, generate a unique account number for said user after activation, and thereafter verify said user has said access based on both said unique account number and said authentication code, said SDE DTA further configured to provide a plurality of converters to said SDE client of a verified user in response to a request therefrom.

2. The SDE manager as recited in claim 1 wherein when said verified user is an originator, said SDE DTA provides said plurality of converters in response to a request from said verified originator to convert an original document to a secure document, and when said verified user is a recipient, said SDE DTA provides said plurality of converters in response to a request from said verified recipient for converting said secure document to said original document.

3. The SDE manager as recited in claim 2 wherein said SDE DTA sends said plurality of converters to said verified recipient after said verified recipient receives said secure document from said verified originator through a generic electronic mail delivery system.

4. The SDE manager as recited in claim 1 wherein said SDE DTA is configured to receive an encrypted message including said password, said pin and said authentication code from said SDE client during said access activation, verify said authentication code is valid and save said authentication code when valid, wherein said encrypted message is encrypted using a global system key.

5. The SDE manager as recited in claim 4 wherein if no password or pin is associated with said email address of said user, said SDE DTA is configured to convert said encrypted message using said global system key, load said received password and pin into an account associated with said e-mail address, create said authentication code based on said password, said pin and an e-mail address of said account, compare said created authorization code to said authorization code received from said user and return an error to said user if said created authorization code fails to match said received authorization code, else said SDE DTA is configured to create said unique account number for said e-mail address activated by the user and return said unique account number to said user.

6. The SDE manager as recited in claim 1 wherein said network is the Internet.

7. The SDE manager as recited in claim 1 wherein said e-mail address, password and pin are provided via said SDE client.

8. The SDE manager as recited in claim 1 wherein said electronic access is a link to download said SDE client.

9. The SDE manager as recited in claim 1 wherein said SDE portal and said SDE DTA are located on different computing devices and said SDE portal is an interface between said SDE client and said SDE DTA.

10. A method of communicating secure data through a generic electronic delivery system, comprising:
   receiving a request from a user at an originator computer to create secure data, said user having a unique identifier and an authentication code associated therewith;
   determining said user has access to create said secure data based on verifying said authentication code, wherein said authentication code is generated from an email address, a password and a pin entered by said user at said originator computer;
   after verifying said user, receiving original data to send through a generic electronic delivery system;
   receiving a selection of a recipient to send said original data from said originator computer employing said generic electronic delivery system;
   receiving a plurality of converters from a remote computer to convert said original data to said secure data having a secure data extension;
   converting said original data to said secure data employing said plurality of converters; and
   initiating said generic electronic delivery system to send said secure data with said secure data extension to a recipient computer associated with said recipient.

11. The method as recited in claim 10 further comprising prompting for said password and said pin via a graphical user interface, receiving said password and said pin via said graphical user interface and receiving a selection of said recipient employing said graphical user interface.

12. The method as recited in claim 10 wherein said receiving said original data includes selecting an existing non-secure document accessible via said originator computer.

13. The method as recited in claim 10 wherein said secure data is sent to said recipient computer without said plurality of converters.

14. The method as recited in claim 10 wherein said converting includes creating an unidentifiable name for said secure data and sending said secure data with said unidentifiable name.

15. The method as recited in claim 10 wherein said plurality of converters includes a DDK and a MSC.

16. The method as recited in claim 10 further comprising sending a request to said remote computer for said plurality of converters.

17. A secure data exchange system located on a computing device of a user, comprising:
   a processor; and
   a secure data exchange client that receives input from a user via a computing device, provides information to said user,
   generates an authentication code associated with said user based on an email address, password and pin provided by said user,
   employs a plurality of converters to convert original data to secure data and directs a generic electronic mail system to send said secure data to a recipient computing device, said secure data having a predetermined extension,
   wherein said user has a unique identifier associated therewith in addition to said authentication code.

18. The secure data exchange system as recited in claim 17 wherein said secure data exchange client is located on logic circuitry of said computing device.

19. The secure data exchange system as recited in claim 17 further comprising an audit trail history.

20. The secure data exchange system as recited in claim 17 further comprising an authorized access history.

* * * * *